US008222990B2

(12) United States Patent
Gerner et al.

(10) Patent No.: US 8,222,990 B2
(45) Date of Patent: Jul. 17, 2012

(54) HYBRID ACCESS CONTROL SYSTEM AND METHOD FOR CONTROLLING THE SAME

(75) Inventors: Nathan Gerner, Waukesha, WI (US); John M. Reske, Racine, WI (US)

(73) Assignee: Honeywell International Inc., Morristown, NJ (US)

( * ) Notice: Subject to any disclaimer, the term of this patent is extended or adjusted under 35 U.S.C. 154(b) by 531 days.

(21) Appl. No.: 12/333,468

(22) Filed: Dec. 12, 2008

(65) Prior Publication Data

US 2010/0148918 A1 Jun. 17, 2010

(51) Int. Cl.
*G05B 19/00* (2006.01)
*H02J 3/32* (2006.01)
*H01M 10/44* (2006.01)
*H04B 7/00* (2006.01)

(52) U.S. Cl. ............ 340/5.2; 340/5.6; 307/48; 320/101; 455/41.2

(58) Field of Classification Search .................... 340/5.2
See application file for complete search history.

(56) References Cited

U.S. PATENT DOCUMENTS

| | | | | | |
|---|---|---|---|---|---|
| 4,700,186 | A | * | 10/1987 | Fujino et al. | 340/12.5 |
| 5,628,216 | A | * | 5/1997 | Qureshi et al. | 70/278.7 |
| 5,692,454 | A | * | 12/1997 | Testa | 119/69.5 |
| 6,046,681 | A | * | 4/2000 | Solop | 340/5.26 |
| 6,323,782 | B1 | * | 11/2001 | Stephens et al. | 340/10.31 |
| 6,989,732 | B2 | * | 1/2006 | Fisher | 340/3.1 |
| 7,445,257 | B2 | * | 11/2008 | Muller et al. | 292/336.3 |
| 7,656,129 | B2 | * | 2/2010 | Banta et al. | 320/141 |
| 7,737,579 | B1 | * | 6/2010 | Czarnecki | 307/64 |
| 2007/0030120 | A1 | * | 2/2007 | Gusse et al. | 340/5.61 |
| 2008/0088413 | A1 | * | 4/2008 | Richter | 340/5.72 |
| 2008/0265023 | A1 | * | 10/2008 | Nassimi | 235/382 |

* cited by examiner

*Primary Examiner* — Jennifer Mehmood
*Assistant Examiner* — John Mortell
(74) *Attorney, Agent, or Firm* — Husch Blackwell

(57) ABSTRACT

A wireless access apparatus for controlling access into a secure area comprises a first power source and a second power source. A controller automatically switches between the first and second power source based at least on a calculated power level of the first and second power source. The controller is connected to either the first or the first and second power source based on the switching. The access apparatus includes a switch having a first position for connecting the first power source to the controller and a second position for connecting second power source to the controller and an electromechanical transducer coupled to the controller for unlocking or locking an entrance into the secure area. The controller determines access to the secure area using information received from an access card.

22 Claims, 7 Drawing Sheets

HYBRID ACCESS CONTROL SYSTEM AND METHOD FOR CONTROLLING THE SAME

FIELD OF THE INVENTION

The invention generally relates to access control devices, rechargeable power devices and wireless communication systems. More particularly, the invention relates to a method, device and system for limiting access to a secure area.

BACKGROUND OF THE INVENTION

Access control systems are used to limit access to secure areas. Access control systems typically include an identification device that is capable of receiving input related to the identity of an individual, such as a unique code, which is stored on a wireless access card. The identification device determines whether an individual is authorized to enter the target area based upon information from the access card. If the input data, e.g., key code, matches data that is pre-stored, the individual is allowed to enter the targeted area. For example, a lock on a door will unlock. The key code is uniquely stored on an access card or key card given to an individual.

Access control systems are commonly used in private buildings, hotels, airports, banks and other secure locations. For example, a room or secured area is equipped with a keycard reader or access device. The reader in combination with a remote host controls access to the room and can unlock a door if the reader detects the proper authorization code on a keycard.

An access device or key card reader can be powered using a battery. However, the battery life of for an access device is limited. The access device can be used for a limited time without replacing the battery. Additionally, the ability for a battery to control a lock is limited. Additionally, the batteries also increase the size of the door control unit.

Alternatively, an access device can be powered with wires attached to a door. However, this requires holes to be drilled in a door or door frame and increases the installation cost as wires must be run between an access control panel and the door.

SUMMARY OF THE INVENTION

Accordingly, disclosed is a wireless access apparatus for controlling access into a secure area. The apparatus comprises a first power source and a second power source. A controller automatically switches between the first and second power source based at least on a calculated power level of the first and second power source. The controller can be connected to either the first power source or both the first and second power sources. The apparatus also comprises a switch having a first position for connecting the first power source to the controller and a second position for connecting second power source to the controller and an electromechanical transducer coupled to the controller for unlocking or locking an entrance into the secure area. The controller determines access to the secure area using information received from an access card.

The first power source is a renewable power source such as a solar panel and the second power source is a rechargeable power source such as a rechargeable battery.

The apparatus also comprises a recharging circuit electrically coupled to the rechargeable battery and electrically coupled to the solar panel. The recharging circuit is adapted to recharge the rechargeable battery using power from the solar panel. The controller issues a recharge enable signal to the recharging circuit instructing the recharging circuit to recharge the rechargeable battery.

The controller issues a recharge enable signal based upon the rechargeable battery power and at least one preset condition, such a preset condition is a set time and a power level of the solar panel.

The switch is activated to connect the rechargeable battery to the controller when the wireless access apparatus is initialized and released to connect the solar panel to the controller.

The wireless access apparatus further comprises a first diode and capacitor. The first diode has a first end coupled to the solar panel and a second end coupled to a first end of the capacitor. The capacitor stores energy from the solar panel.

The wireless access apparatus further comprises a transceiver for polling access cards within a predefined area and for receiving access information from the access cards. The transceiver transmits the received access information to a remote host control device and receives an access enable or disable signal from the remote host control device based upon a comparison of the received access information and preset list of approved access cards.

The controller calculates a voltage level of the rechargeable battery and instructs the transceiver to transmit a battery dead signal to a remote host control device if the voltage level of the battery is lower than a predetermined threshold.

Also disclosed is a wireless access apparatus for controlling access into a secure area comprising a first motion sensor for detecting motion in a first predetermined range, a transceiver for polling access cards within the first predetermined range and for receiving access information from the access cards, a controller for activating the transceiver to poll access cards within the first predetermined range, if the first motion sensor detects motion, and for determining if access card is within the first predetermined range and an electromechanical transducer coupled to the controller for unlocking or locking an entrance into the secure area. The controller determines access to the secure area using information received from an access card The wireless access apparatus further comprises a second motion sensor for detecting motion in a second predetermined range. The controller instructs the electromechanical transducer to unlock the entrance if the controller determines that access is allowed into the secure area using information received from an access card and if the second motion sensor detects motion within a preset period of time after the first motion sensor detects motion. The second predetermined range is smaller than the first predetermined range. The second motion sensor is a capacitive sensing element coupled to a handle of the entrance.

Also disclosed is a method of controlling access into a protected area. The method comprises the steps of detecting motion within a first predetermined range, activating a transmitter for polling access cards within the first predetermined range, determining if any access cards are within the first predetermined range, determining if any of the access cards within the first predetermined range is authorized for entry into the protected area and unlocking an entrance to the protected area based upon the determination of authorization.

The method further comprises the steps of detecting motion within a second predetermined ranges and unlocking an entrance to the protected area based upon the determination of authorization and a detection result.

The method further comprises the steps of determining a voltage level of a renewable power source, determining a voltage level of a rechargeable power source and connecting either the renewable power source or both the renewable power source and rechargeable power source to a controller based upon the determined voltage levels.

The method further comprises the step of transmitting a low power message to a remote host access control device based upon the voltage level of the rechargeable power source.

The method further comprises switching a power source to the rechargeable power source, calculating a power life, determining if it is time to recharge the rechargeable power source and recharging the rechargeable battery source based upon the determination. The determination can be based on receiving a recharge enable signal, past history, or a measured voltage level of the renewable power source.

Also disclosed is a method of controlling access into a protected area comprising the steps of detecting motion within a first predetermined range, activating a receiver for receiving signals from access cards within the first predetermined range, determining if any access cards are within the first predetermined range, determining if any of the access cards within the first predetermined range is authorized for entry into the protected area and unlocking an entrance to the protected area based upon the determination of authorization.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
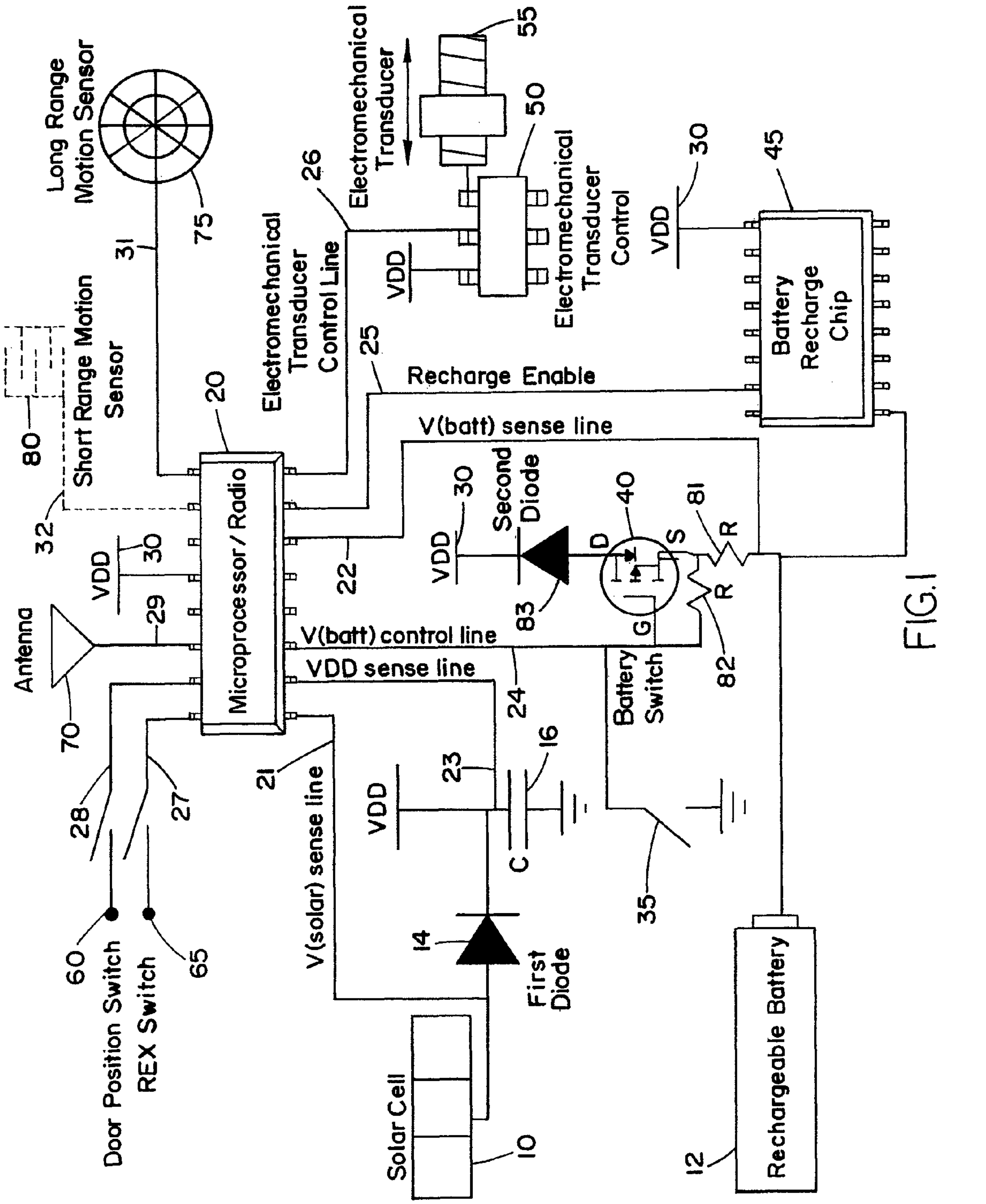
FIG. 1 illustrates an access control device according to the invention.

FIG. 1 illustrates an access control device, indicated generally by the number 1, according to the present invention. The access control device 1 has multiple power sources 10, 12. As depicted in FIG. 1, the access control device 1 includes a solar cell 10 and a rechargeable battery 12. While FIG. 1 illustrates the power sources as a solar cell 10 and a rechargeable battery 12 other power sources can be used. The first power source is a self-generating power source that is renewable, such as generating power from temperature differences, heat, wind or vibration. For example, the first power source can be a MEMS device that produces electricity from vibrations. Alternatively, the first power source can be an electromechanical transducer or a thermal-electro transducer such as a thermal-electric device, e.g., thermal couple. The second power source is a power source that can be charged. The second power source can be any type of energy storage device such as a capacitor.

The solar cell 10 is coupled to one end of a first diode 14. The first diode 14 prevents charge from being discharged to leak back towards the solar cell 10. The other end of the first diode 14 is coupled to a capacitor C 16. The capacitor C 16 acts as an energy storage device.

The access control device 1 includes a toggle switch 35 that enables a user to manually switch between the multiple power sources 10, 12. The toggle switch has two positions. A first position where the solar cell 10 is connected to the microprocessor 20 and a second position where the rechargeable battery 12 is connected to the microprocessor 20. The toggle switch 35 can be a push button that is depressed to force the rechargeable battery 12 to be connected to the microprocessor 20 to power the microprocessor 20. This toggle switch 35 is particularly useful during installation where the solar cell capacitor 16 may not be charged. The access control device 1 may not have had any access to light during shipment.

The access control device 1 further includes a microprocessor 20. As depicted, in FIG. 1 microprocessor 20 includes an integrated radio. The microprocessor 20 controls the functionality of the access control device 1 including, but not limited to, measuring voltage of both the solar cell 10 and rechargeable battery 12, controlling which power source 10, 12 is used to power the access control device 1, measuring the power input to the microprocessor 20, enabling recharging of the rechargeable battery 12, determining when to recharge the rechargeable battery 12, activating a electromechanical transducer control 50 and electromechanical transducer 55 to unlock and lock a entrance 205 into a protected area and activating the radio portion. Additionally, the microprocessor 20 determines if motion is detected by a motion sensor 75 and/or a second motion sensor 80.

The microprocessor 20 includes a plurality of I/O pins. The microprocessor 20 receives its board voltage, depicted as VDD though line 30. The microprocessor 20 senses voltage of the solar cell, through the V(solar) sense line 21 and senses voltage of the rechargeable battery, through the V(battery) sense line 22. The microprocessor 20 sensing the board voltage, VDD through the VDD sense line 23. The microprocessor 20 controls which power source is supplied to the various components of the access control device 1 via the V(batt) control line 24. Specifically, the microprocessor 20 can switch power sources between the solar cell 10 and the rechargeable battery 12. The switching will be described in detailed later. The microprocessor 20 controls a battery recharge chip 45 through a recharge enable line 25. When the rechargeable battery 12 is recharged, the microprocessor 20 issues an enable signal to the battery recharge chip 45. The microprocessor 20 controls an electromechanical transducer control 50 to cause an electromechanical transducer 55 to unlock or lock a door or entrance through the electromechanical transducer control line 26. The microprocessor 20 receives input from a door position switch 60 and a REX switch 65 through signal lines 27 and 28, respectively. The microprocessor 20 outputs the radio signals through line 29 to antenna 70. The microprocessor 20 receives input from a motion sensor 75 and second motion sensor 80 through signal lines 31 and 32. Motion sensor 75 is a long range sensor and second motion sensor 80 is a short range motion sensor. During initialization, the microprocessor 20 sets up the input and output pins to have the appropriate inputs and outputs as defined above.

The access control device 1 contains a battery switch 40 that controls the connection of V(batt) to VDD (30), e.g., lines 21-23. The battery switch 40 may be implemented with a FET, MOSFET, BJT, or other switching mechanism. FIG. 1 illustrates a p-channel FET as an example. The V(batt) resistor 81 is for current limitation of V(batt). The V(batt) control line resistor 82 enables a default configuration of the battery switch 40 to be off, so V(batt) is disconnected from VDD 30. This prevents the rechargeable battery 12 from discharging during its shelf life. The second diode 83 prevents a dead rechargeable battery 12 from discharging the VDD 30 voltage. The gate of the FET is connected to the toggle switch 35, which forces a connection between V(batt) and VDD 30.

When the toggle switch 35 is pressed, VDD 30 is connected to V(batt), and the microprocessor's voltage source, VDD 30, is charged. When VDD 30 is charged to the operating voltage of the microprocessor, the microprocessor 20 decides if there is enough solar power for operation. If there is enough solar power, then the microprocessor 20 applies a voltage to the V(batt) control line (line 24), which opens the battery switch 40 and disconnects V(batt) from VDD 30. If there is not enough solar power for operation, then the microprocessor 20 pulls the V(batt) control line to ground (line 24), which keeps the battery switch 40 on and V(batt) connected to VDD 30.

In an embodiment, the microprocessor 20 is mainly in a low power sleep mode. The microprocessor 20 periodically wakes up from sleep mode and monitors the voltage levels of the power sources 10, 12 and microprocessor voltage, i.e., V(solar) sense line 21, V(batt) sense line 22, and VDD sense line 23. Additionally, the microprocessor 20 monitors the input lines from the REX switch and door position switch 27, 28 (from door position switch 60 and REX switch 65).

The motion sensor 75 is adapted to detect motion within a predetermined range. The motion sensor 75 can be any motion sensor such as a PIR sensor or a microwave motion sensor. The second motion sensor 80 is adapted to detect motion within a small predetermined range. The second motion sensor 80 is a sensor that can detect a touch or close proximity. For example, the second motion sensor 80 can be, but is not limited to, a capacitive sensing element, a MEMs device, a heat sensor or a pushbutton that is attached to a door handle. The second motion sensor 80 will detect if a door handle is being used to open a door or entrance 205. This would enable the entrance 205 to be only unlocked when a person is touching the door handle or if the person's hand is moving towards the door handle.

An integrated radio device uses the antenna 70 to transmit and receive a wireless signal. The wireless signal can be any low power wireless network protocol signal. For example, Zigbee protocol can be used, e.g., IEEE 802.15.4a. Although the microprocessor 20 is depicted as having an integrated radio, a separate radio transceiver can be used.

The radio device transmits a polling signal to detect wireless access cards 200 or tags within a preset area. Any wireless access card 200 that receives the polling signal will respond with identification information relating to the wireless access card 200. In another embodiment, if the wireless access card 200 is an active card, the microprocessor 20 activates the receiver portion of the radio device and listens for the wireless access card 200. This information is used by the access control device 1 to determine if a person holding the wireless access card 200 is authorized to gain access to the secure area. In an embodiment, the radio device is mainly in a low power sleep mode. The radio device wakes up from sleep mode when an event is detected. An event can be low battery power, detected motion by the motion sensor 75, a detected change in a door position switch 60, and REX switch detection 65. The microprocessor 20 activates the radio device from sleep mode.

The battery recharge chip 45 controls recharging the rechargeable battery 12. In an embodiment, the battery recharge chip 45 is integrated into the microprocessor 20. The battery recharge chip 45 regulates the current flowing to the rechargeable battery 12. The battery recharge chip 45 receives the board voltage 30 and the recharge enable signal via line 25 from the microprocessor 20. The battery recharge chip 45 outputs a regulated voltage and current to the rechargeable battery 12 during recharging. Once the recharging is complete, the battery recharge chip 45 stops the recharging process.

An electromechanical transducer control 50 controls an electromechanical transducer 55 to unlock or lock the entrance. For example, the electromechanical transducer 55 can be a micro actuator or motor for unlocking or locking the entrance 205. In another embodiment, a low power solenoid can be used to unlock/lock of the entrance 205. Any device that can convert electrical energy into mechanical energy in order to control a locking pin can be used. The electromechanical transducer control 50 receives an enable signal via the electromechanical transducer control line 26 to unlock the entrance 205. In an embodiment, the signal is received when a person having an authorized wireless access card 200 is detected by the microprocessor 20. In another embodiment, the enable signal is received when a person having an authorized access card is detected and movement is detected in close proximity to the entrance 205. The electromechanical transducer 55 is powered by the rechargeable battery 12. The microprocessor 20 switches power source to the rechargeable battery 12 when the lock needs to be unlocked.

The door position switch 60 detects a position of the entrance or door 205, i.e., opened or closed. A Request to Exit, (REX) switch 65 detects whether a request to exit is received prior to the door position switch 60 detecting that a door or entrance 205 is opened.

In an embodiment, the microprocessor 20 directly determines access to the secure area using information stored in a memory section (not shown). In another embodiment, the microprocessor 20 relays the identification information to a host access control panel 220. The host access control panel 220 determines access using the received identification information and pre-stored information. The host access control panel 220 transmits an access or deny signal to the access control device 1. The microprocessor 20 receives this signal and controls the electromechanical transducer control 50 accordingly.

Figure 2A:
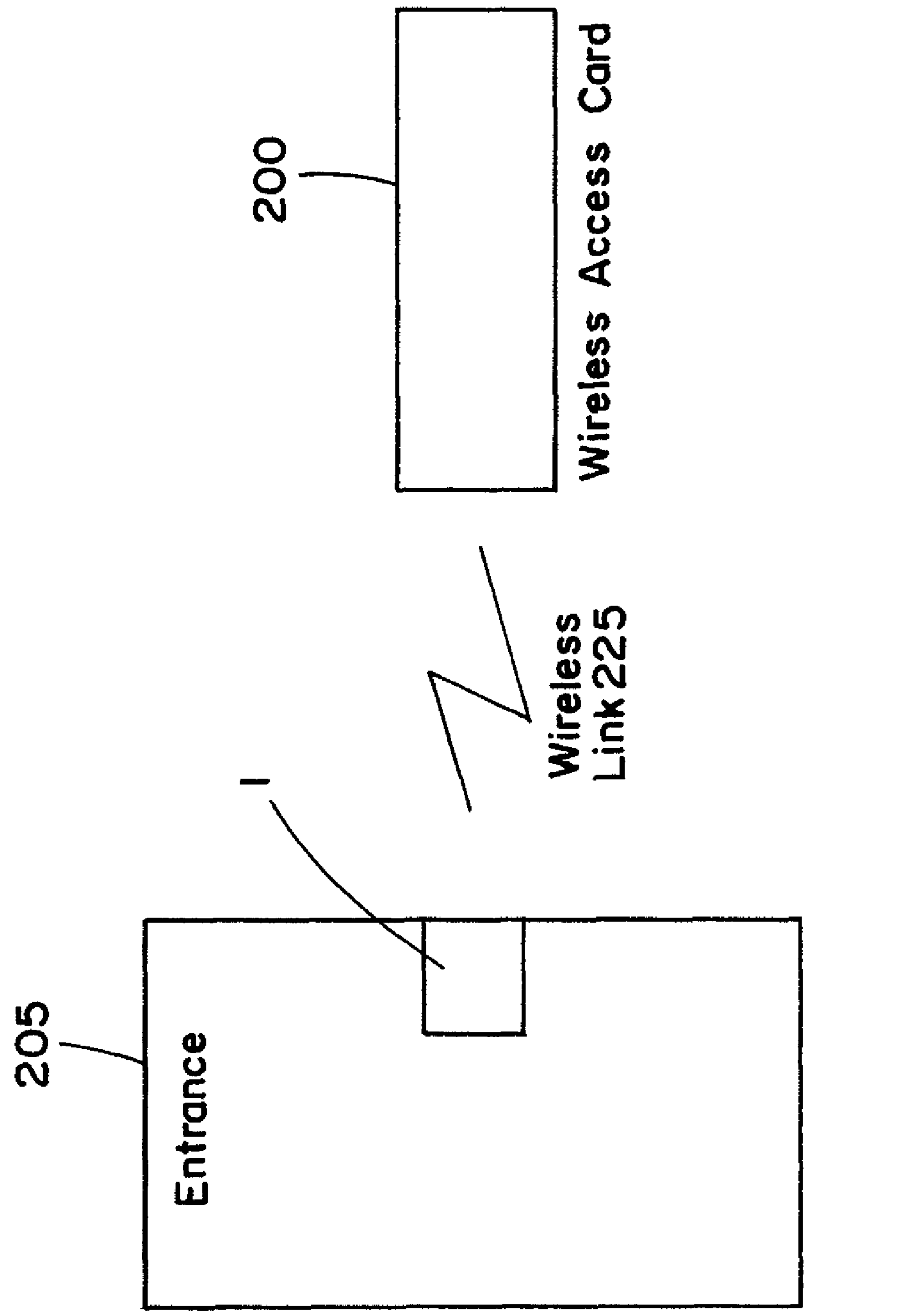
FIG. 2A illustrates an access control system according to an embodiment of the invention.

FIG. 2A depicts an access control system 250 having the access control device 1 according to an embodiment of the invention with a wireless access card. The wireless access card 200 is an access card. The wireless access card 200 can be an active card or a passive card. An active card uses active wireless technology and includes its own power source, such as a battery. An active wireless access card does not have to be "swiped" to be read by the access control device 1. The access control device 1 is attached to an entrance or door 205. The door 205 blocks or enables access to a secure area. The access control device 1 is in wireless communication with a host access control panel 220 via a wireless link 225. The host access control panel 220 is remote from the access control device 1. Wireless repeaters 210 are used to increase the communication range of the access control device 1. This allows the transmission power for the transmitter to be relatively low. Any number of wireless repeaters 210 can be used and is a function of the distance between access control device 1 and host access control panel 220. The host access control panel 220 maintains a list of allowable wireless access cards 200. The host access control panel 220 receives identification information from the access control device 1 and compares the identification information with a list of allowable wireless access cards 200. If there is a match, the host access control panel 220 transmits a signal enabling the access control device 1 to unlock the entrance or door 205. The access control device 1 periodically transmits the status of the REX switch and door position switch (lines 27, 28 respectively) to the host access control panel 220. In an embodiment, the access control device 1 also transmits the battery status, recharges status and queried events.

Figure 2B:
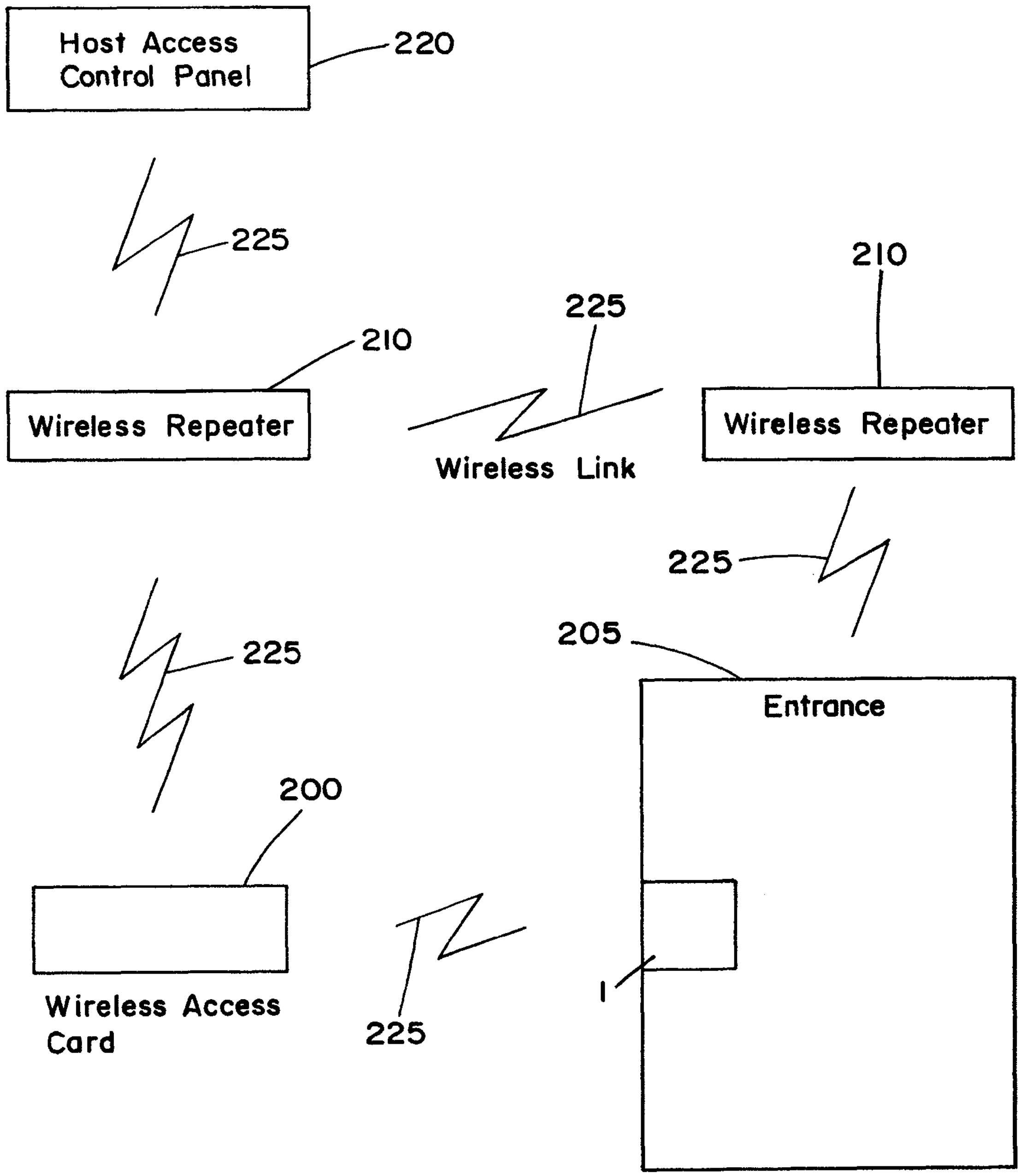
FIG. 2B illustrates an access control system according to another embodiment of the invention.

FIG. 2B depicts an access control system 250*a* having the access control device 1 according to another embodiment of the invention with a wireless access card 200. The access control system 250*a* depicted in FIG. 2B differs from the access control system 250 depicted in FIG. 2A in that host access control panel 220 is not used. The access control device 1 is a standalone device. A list of authorized wireless access cards is preloaded into the access control device 1. The access control device 1 determines whether a wireless access card 200 is authorized.

Figure 3:
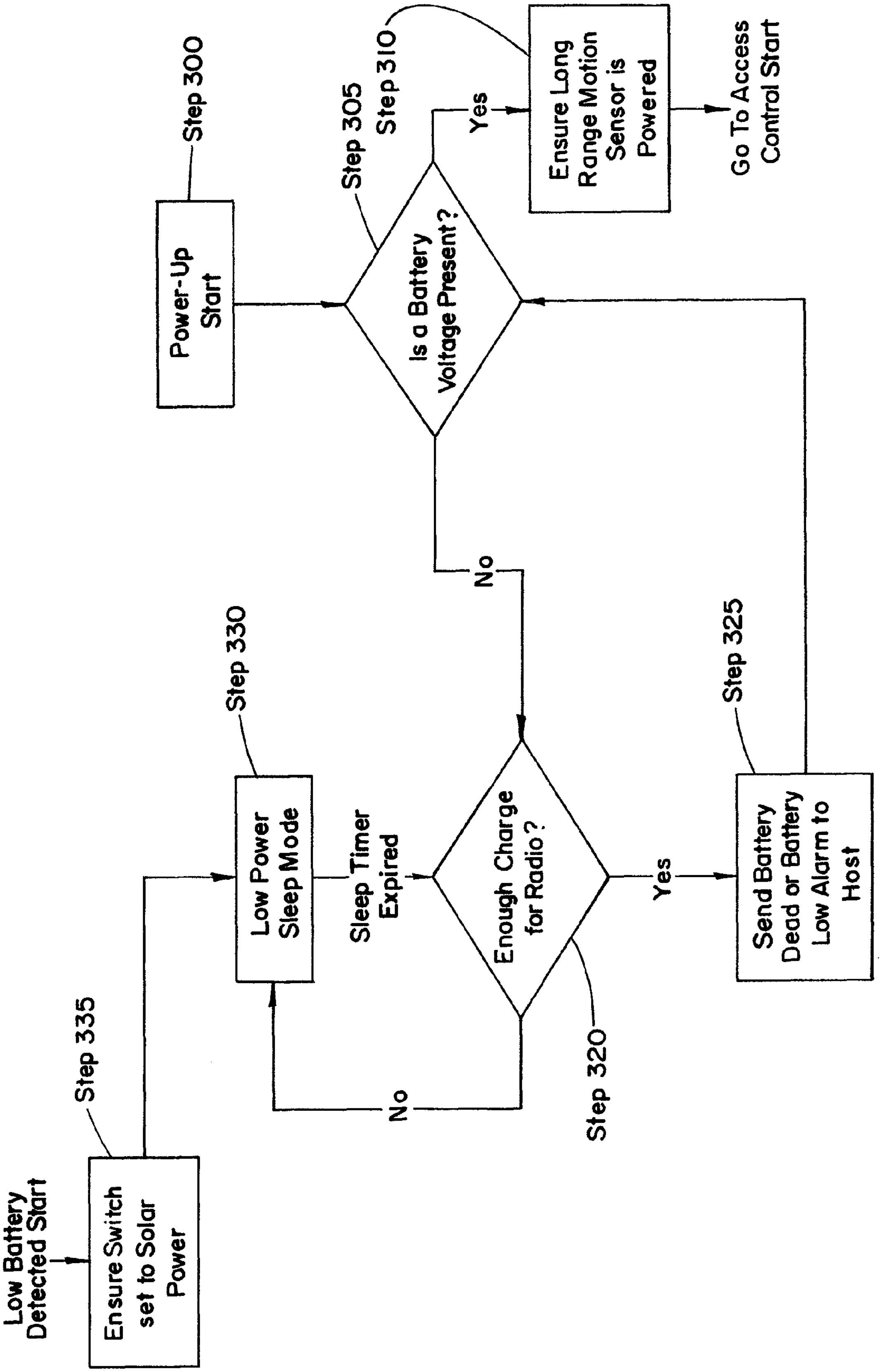
FIG. 3 illustrates a flow chart for initializing the access control device during startup and wakeup.

FIG. 3 illustrates a method for monitoring the power level in the wireless access control device 1 during startup and wakeup.

At step 300, the wireless access control device 1 is initialized. At step 305, the microprocessor 20 determines if a battery voltage is present. The microprocessor 20 checks the V(batt) sense line 22 for a voltage level. If the voltage level is above a predetermined threshold value, e.g. lower limit, a voltage is present and the method proceeds to step 310. If the voltage level is below a predetermined threshold (at step 305), the microprocessor 20 determines if there is enough power to charge the radio, at step 320. In an embodiment, the radio needs approximately 21 mA of current at 3V to transmit a signal. Typically, the amount of power required to power a radio is between 7 mA and 30 mA at 3V, however, the value varies depending on the specification of the radio device. If there is enough power to transmit a message, the microprocessor 20 instructs the radio to transmit a "battery dead" message at step 325. The radio is powered using the solar cell 10.

If there is not enough power to charge the radio, at step 320, the microprocessor 20 sets a sleep timer and causes the wireless access control device 1 to sleep (step 330). Even if the battery is dead, in an embodiment the access control device 1 can still transmit a message to a host access control panel 220, using the solar cell 10. In low power mode 330, the power consumed by the access control device 1 is reduced from an active mode. In low power mode (step 330), a trickle current is provided to the radio and microprocessor 20. Only a small trickle current is required to power the radio. For example, in low power mode, the microprocessor 20 uses approximately 0.01 mA and the radio uses approximately 0.0004 mA.

At step 310, the microprocessor 20 powers the motion sensor 75 via line 31. The motion sensor 75 can be powered using either power source 10, 12. The microprocessor 20 determines which power source (10 or 12) to connect to the motion sensor 75, based upon the voltage levels, V(batt) and V(solar) input into the sense lines 21 and 22, respectively. If the voltage of the V(solar) sense line is greater than a predetermined value, the microprocessor 20 powers the motion sensor 75 using power from the solar cell 10. If the voltage of the V(solar) sense line is less than a predetermined value, the microprocessor 20 powers the motion sensor 75 using power from the rechargeable battery 12.

The method then proceeds to the access control (step 400).

Figure 4A:
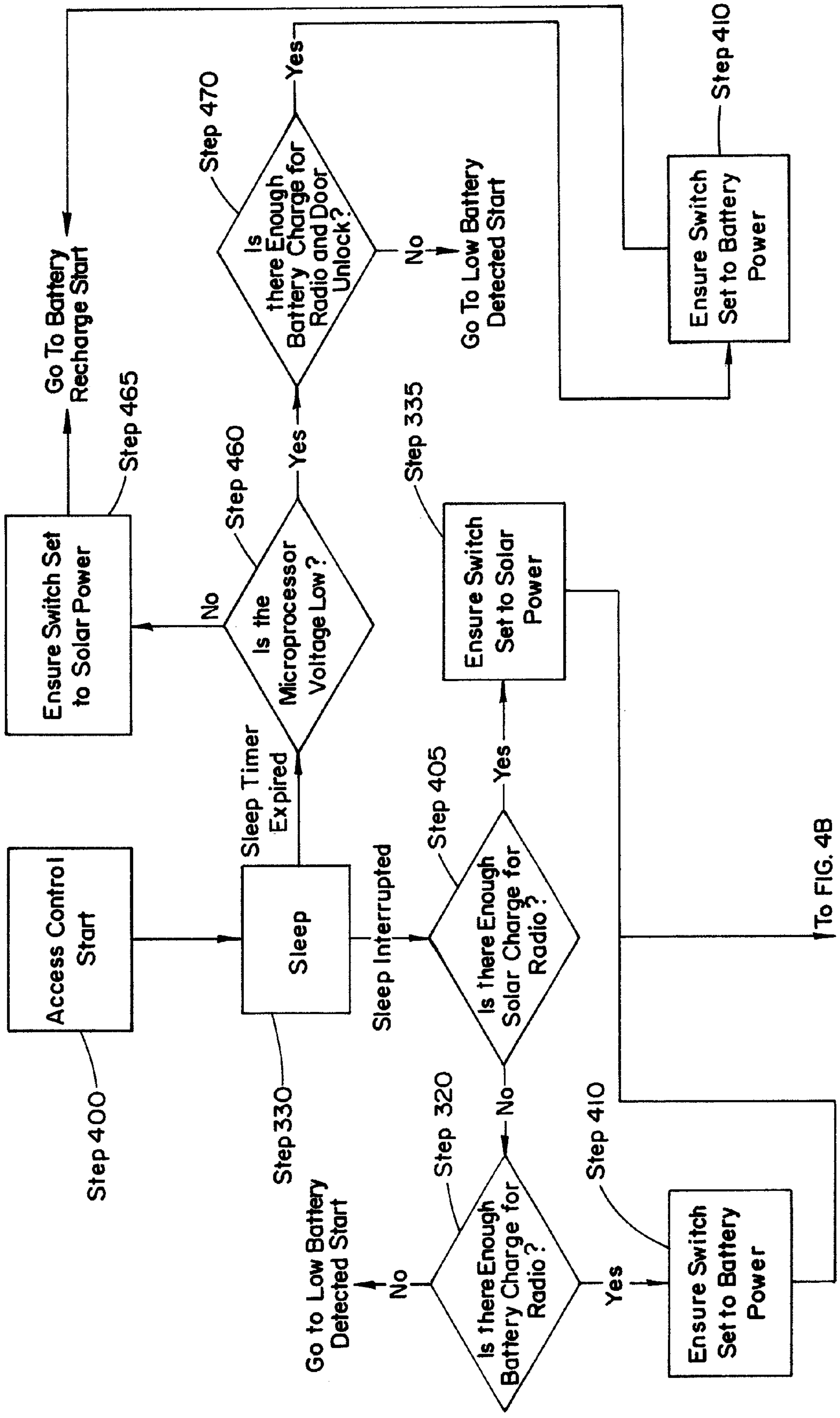
FIGS. 4A, 4B, and 5 illustrate a flow chart for operating the access control device according to the invention.
Figure 4B:
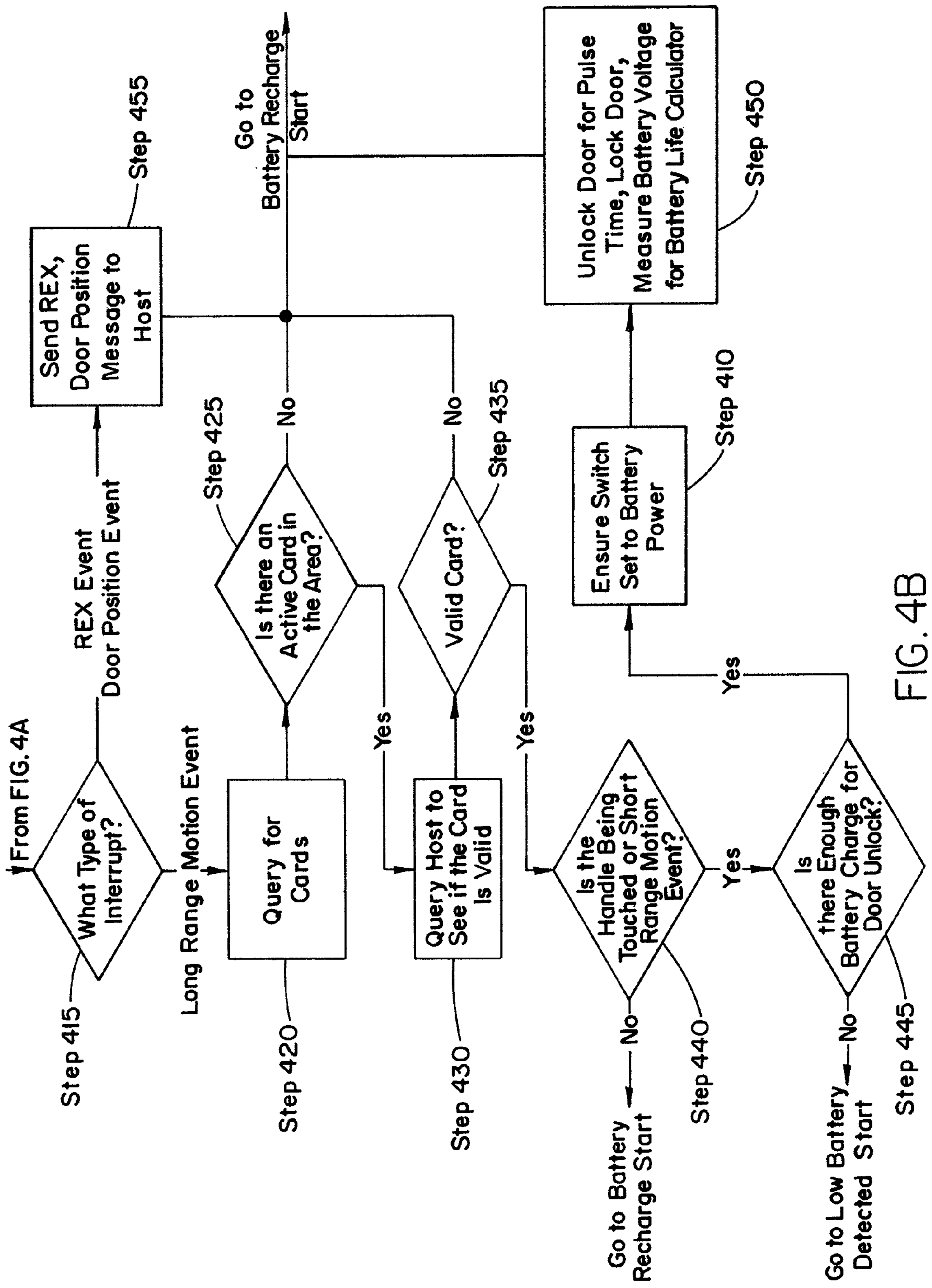
Figure 5:
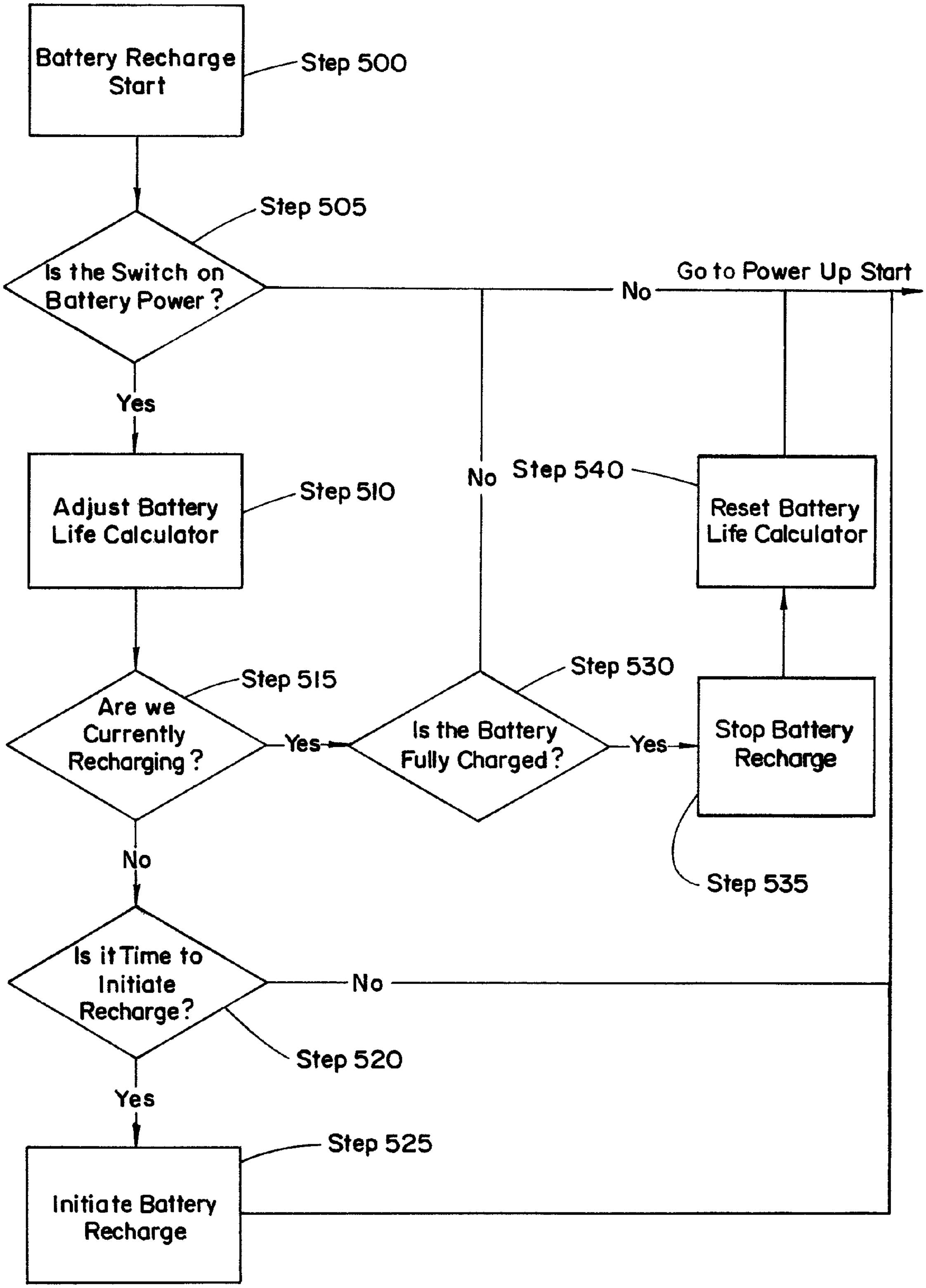

FIGS. 4A, 4B and 5 illustrate an access control method according to an embodiment of the invention. Similar functions or steps are labeled with the same reference numbers in both FIGS. 3 and 4.

The access control method starts with the wireless access control device 1 in low power or sleep mode (e.g., step 330). The microprocessor 20 sets a sleep timer to a preset time. The access control device 1 remains in sleep mode until the timer expires or a sleep interrupt is detected. A sleep interrupt can be the detection of motion within a first predetermined area, a REX event or a door position event.

If the sleep mode (step 330) is interrupted, e.g., due to one or more of the above-listed events the microprocessor 20 determines if there is enough power to charge the radio using power from the solar cell 10, at step 405. The microprocessor 20 measures the voltage input from the V(solar) sense line 21.

The microprocessor 20 determines if the voltage from the V(solar) sense line 21 is large enough to supply the needed power for both transmitting and receiving signals.

In one embodiment, the access control device 1, in active mode, reports its status to the host access control panel 220, and can receive wireless access card 200 approval from the host access control panel 220 and can transmit and receive signals to and from a wireless access card 200.

If there is enough power to charge the radio using the solar cell 10, the microprocessor 20 sets the battery switch 40 in a manner to enable the solar cell 10 to power the radio, at step 335. In an embodiment, the microprocessor 20 pulls the V(battery) control line 24 to ground in order to switch to the rechargeable battery 12. The microprocessor 20 pulls the V(batt) control line 24 to VDD 30 in order to switch to the solar cell 10.

If there is not enough power to charge the radio using the solar cell 10, e.g., voltage too low, the microprocessor 20 determines if there is enough battery charge or power to power the radio device, e.g., step 320. If there is enough battery power, then the microprocessor 20 sets the battery switch 40 in a manner to enable the rechargeable battery 12 to power the radio, at step 410. If there is not enough power to charge the radio device, then the process proceeds to the low battery detect start and step 335.

In an embodiment, the microprocessor 20 pulls the V(batt) control line 24 to ground in order to switch to the rechargeable battery 12. The microprocessor 20 pulls the V(batt) control line 24 to VDD 30 in order to switch to the solar cell 10. If the battery is too low to power the radio device, electromechanical transducer control 50 and electromechanical transducer 55, the access control device 1 will attempt to send a battery low message to the host access control panel 220. The access control device 1 will continue sending the battery low message until the battery voltage exceeds the predetermined threshold.

At step 415, the microprocessor 20 determines what caused the sleep interrupt, e.g., motion within a first predetermined area, a REX event or a door position event. The microprocessor 20 monitors the input lines 27, 28, and 31, respectively for signals from the REX switch 65, door position switch 60 and the motion sensor 75. If the motion sensor 75 detects motion, e.g., a signal pattern received by the microprocessor 20 is indicative of motion; the microprocessor 20 activates the radio to poll the first predetermined area for wireless access cards 200, at step 420. The radio broadcasts a polling signal in the first predetermined area. Any access card within the first predetermined area responds to the polling signal. The response includes identification information corresponding to the wireless access card 200.

At step 425, the microprocessor 20 determines if the radio receives a response to the polling signal. If a response is received, in an embodiment the microprocessor 20 relays the identification information to the host access control panel 220 to determined if the wireless access card 200 is valid and authorized for entry into the secure area, at step 430. The host access control panel 220 determines if the wireless access card 200 is valid and authorized, at step 435, by comparing the received identification information with a list of authorized wireless access cards. The host access control panel 220 returns an enable or disable signal to the wireless access control device 1 that instructs the device to either unlock the entrance or door 205 for a preset period of time or to keep the entrance or door 205 locked. In another embodiment, the microprocessor 20 directly determines authorization without relaying the identification information to the host access control panel 220, i.e. skip step 430.

The microprocessor 20 then determines if there is enough battery charge or power to unlock the entrance 205 at step 445, i.e., voltage. If there is not enough power to power the motor or unlock the door, then the process moves to low battery detected start and step 335. If there is enough battery power to unlock the entrance 205, the microprocessor 20 ensures that the battery switch 40 is set to the rechargeable battery 12, at step 410.

If the entrance or door 205 is unlocked, the microprocessor 20 sets the battery switch 40 in a manner to enable the rechargeable battery 12 to power the electromechanical transducer control 50 and electromechanical transducer 55, at step 410. Optionally, prior to opening the door, a second motion sensor 80 can be monitored to determine if a person with a valid and authorized wireless access card 200 is approaching the entrance or door 205 or is touching a door handle, at step 440. The second motion sensor 80 is adapted to detect motion within a short range or distance, e.g. less than a foot. The microprocessor 20 starts a timer when the motion sensor 75 detects motion and stops the timer when the second motion sensor 80 detects motion. The microprocessor 20 then compares the time from the timer with a preset period of time.

If both the first and second motion sensors 75, 80 detect motion within a preset period of time, and if a valid and authorized wireless access card 200 is detected, the entrance or door 205 is unlocked (step 450), otherwise, the entrance 205 remains locked, and a determination is made if the battery needs to be recharged (step 500).

At step 450, the microprocessor 20, generates enable signal to the electromechanical transducer control 50 using the electromechanical transducer Control Line 26. The electromechanical transducer control 50 causes the electromechanical transducer 55 unlocks the entrance 205. The entrance or door 205 is unlocked for a preset period of time, e.g., pulse time. In another embodiment, the entrance or door 205 is locked with a low power magnetic lock.

After the preset period of time expires, the entrance or door 205 is locked. The electromechanical transducer control 50 stops the electromechanical transducer 55.

In embodiments with a host access control panel 220, the access control device 1 can received wireless command to unlock or lock the door for a preset period of time, e.g., with a public door where it is desirable to keep the door unlocked for an extended period of time (work hours).

After the entrance 205 is locked, the microprocessor 20 measures the voltage of the rechargeable battery 12, i.e., voltage on the V(batt) sense line 22, at step 450. The measured voltage is used to update a calculated battery life. The calculation of the battery life will be described later. In an embodiment, the access control device 1 transmits a signal to the host access control panel 220 indicating that the entrance or door 205 had been opened. The host access control panel 220 stores the information contained in the signal. This allows the host access control panel 220 to maintain a record of the time a person entered the secure area.

If at step 415, the sleep interrupt is not caused by a motion event, but rather a REX event or a door position event, the process moves to step 455.

The microprocessor 20 receives a signal from the REX switch 65, door position switch 60 via input lines 27 and 28 indicating a change in a door position and/or an exit. At step 455, in an embodiment the access control device 1 informs the host access control panel 220 of the change. The microprocessor 20 instructs the radio to transmit a signal to the host access control panel 220. The signal includes the type of event and the time. Additionally, the signal can include other status information. In another embodiment, instead of transmitting a signal to the host access control panel 220, the access control device 1 records the status and change of switch positions, i.e., signals from input lines 27 and 28, in its own memory.

When the sleep timer expires, i.e., no sleep interrupt event, the microprocessor 20 determines its power level, i.e., voltage at the VDD sense line 23, at step 460. The microprocessor 20 compares the determined voltage with a predetermined voltage threshold. If the microprocessor voltage is large enough, i.e., VDD greater than the predetermined voltage, the microprocessor 20 sets the battery switch 40 in a manner to enable the solar cell 10 to power the microprocessor 20, at step 465.

If the microprocessor voltage is low, i.e., VDD less than the predetermined voltage, the microprocessor 20 determines if there is enough battery power from the rechargeable battery 12 to power both the radio device and the door lock, i.e., unlock the entrance 205, at step 470. If there is not enough power in the rechargeable battery 12 to power both devices and functions, the process moves to the low battery detected start, and step 335. If there is enough power in the rechargeable battery 12 to power both, the microprocessor 20 sets the battery switch 40 in a manner to enable the rechargeable battery 12 to power the microprocessor 20 (e.g., step 410).

The process then advances to a battery recharge state (step 500) as depicted in FIG. 5.

At step 505, the microprocessor 20 determines the state of the battery switch 40, i.e., solar cell 10 or rechargeable battery 12. If the solar cell 10 is powering the wireless access control device 1, the method returns to power up start, at step 300.

If the rechargeable battery 12 is powering the access control device 1, the battery life is calculated and a determination is made whether the rechargeable battery 12 needs to be recharged at step 510. The rechargeable battery 12 is recharged when the battery is depleted to a preset amount of its initial charge. The preset amount can be varied based upon usage and is determined based upon the need to maintain full function of the access control device 1 during charge. For example, the preset amount can be 25% of the full charge. The microprocessor 20 determines the current charge and compares the charge with the full charge. In an embodiment, a full charge is deemed 4V and 2500 mAH. If the rechargeable battery 12 needs to be recharged, the microprocessor 20 set a recharge enable flag.

The battery life is calculated using the current battery voltage, a duty cycle relative to the time the access control device 1 is in sleep mode or active, a number of times the entrance is unlocked. The battery life calculation is used to predict when to charge the rechargeable battery 12.

Table 1 illustrates a sample battery life calculator.

| Mode | Current (mA) | Duty Cycle % |
|---|---|---|
| Microprocessor | | |
| Sleep (Idle) | 0.01 | 75 |
| Active, ADC on | 3 | 25 |
| % time powered by Solar | 30 | 30 |
| % time powered by Battery | 70 | 70 |
| PIR Sensor | | |
| Active | 0.1 | 25 |
| % time powered by Solar | 30 | 30 |
| % time powered by Battery | 70 | 70 |

-continued

| | | |
|---|---|---|
| Radio | | |
| Sleep (Idle) | 0.0004 | 98.97916667 |
| Low Power RX (looking for carrier) | 0.0081 | 1.020833333 |
| RX on | 20 | 0.680555556 |
| TX on | 21 | 1.701388889 |
| % time powered by Solar | 30 | 30 |
| % time powered by Battery | 70 | 70 |
| Actuator | | |
| Not in Motion | 0 | 99.99791667 |
| in Motion | 100 | 0.002083333 |
| % time powered by Solar | 30 | 30 |
| % time powered by Battery | 70 | 70 |
| Recharge Characteristics | | Battery Charge (mAh) |
| % of battery depleted between charges | 75 | 2500 |
| Number of recharges | 50 | |
| Actuator Duty Cycle Calculation | | |
| Number of seconds per | 0.9 | |
| Number of times per day the door opens | 200 | |
| Duty Cycle (%) | 0.002083333 | |
| Radio Duty Cycle Calculation | (30%, 20%, 50%) | |
| Number of times triggered during a day | 588 | |
| Time awake per trigger (sec) | 5 | |
| Time in Low RX on per trigger (sec) | 1.5 | |
| Time RXing message (sec) | 1 | |
| Time TX on per trigger (sec) | 2.5 | |

| | Consumed mA |
|---|---|
| Battery Only | 0.0075 |
| Battery Only | 0.75 |
| Total with Solar | 0.53025 |
| Total with Battery Only | 0.7575 |
| Battery Only | 0.025 |
| Total with Solar | 0.0175 |
| Total with Battery Only | 0.025 |
| Battery Only | 0.000395917 |
| Battery Only | 8.26875E-05 |
| Battery Only | 0.136111111 |
| Battery Only | 0.357291667 |
| Total with Solar | 0.345716967 |
| Total with Battery Only | 0.493881382 |
| Battery Only | 0 |
| Battery Only | 0.002083333 |
| Total with Solar | 0.001458333 |
| Total with Battery Only | 0.002083333 |
| | Model 1 |
| Overall Total with Battery Only | 1.278464715 |
| Overall Total with Solar | 0.894925301 |
| | Battery Life (days) |
| Battery Life with no Solar Charge | 81.47793633 |
| Recharge interval with Solar Charge | 116.3970519 |
| With Recharge | 4364.889446 |
| | Battery Life (Months) |
| Battery Life with no Solar Charge | 2.716931211 |
| Recharge interval with Solar Charge | 3.87990173 |
| With Recharge | 145.4963149 |

The consumed current (i.e., consumed mA) is calculated using the input information for radio duty cycle, duty cycle percent, and time on for each component. Additionally, the duty cycle (%) is updated and calculated.

The current consumed by each device is apriori known for the mode. For example, in the sample battery life calculator, the microprocessor uses 0.01 mA in sleep mode and 3 mA in active mode. Similarly, the radio uses 0.0004 mA in sleep mode, when looking for a carrier 0.0081 mA, receiving 20 mA and transmitting 21 mA.

Initially, the percentage of time powered via the solar cell 10 and rechargeable 12, the radio duty cycle, time awake for each mode or device and number of door unlock/lock event is set to a default number. For example, initially the default power percentage of time for the microprocessor 20, motion sensor 75, radio, electromechanical transducer 55 is set to 30% rechargeable battery 12 and 70% solar cell 10 power. Additionally, the number of door unlock/lock event is set to 200. The sample battery life calculator uses a sleep time of five minutes in the calculation in the above identified example.

However, these default numbers can be updated based upon actual operation of the access control device 1. Additionally, parameters such as sleep time can be modified by an installer or at a later time by a user or host wireless access control panel.

The battery life calculator can be used to proactively alert a host wireless access control panel 220 that the rechargeable battery 12 needs to be replaced. For example, if a rechargeable battery 12 can be recharged 50 times. The battery life calculator can track the recharge history for the battery. If the number of recharges for the rechargeable battery 12 is less than a preset amount, a signal can be transmitted by the radio to the host access control panel 220. Additionally, in an embodiment, the access control panel 1 can include a notification device for notifying a person that the battery needs to be replaced. For example, a LED, with low power consumption, can be used for the notification device. The LED would be attached to an outside surface of housing for the access control device 1.

At step 510, each of the current consumed parameters and power duty cycles, i.e., % time power by solar cell 10 verses rechargeable battery 12 is recalculated using the most recent information to account for all activity the occurred between updates. Adjusting these parameters updates the Recharge Interval. This is the amount of time that the device can function before needing to be recharged. The "actual time since last recharge" is updated as well. These times are compared to predict when to recharge the rechargeable battery 12. A rechargeable enable flag is set when the actual time since last recharge is equal to or greater than the Recharge Interval.

At step 515, the microprocessor 20 determines if a battery recharge chip 45 is active and recharging the rechargeable battery 12. If the rechargeable battery 12 is not being recharged, the microprocessor 20 checks to see if the recharge enable flag is set at step 520. If the recharge enable flag is set, the microprocessor 20 determines if it is time to initiate the recharge.

A recharge is initiated where the solar cell 10 power level is expected to be greater than a predetermined level over a period of time. In one embodiment, the host access control panel 220 transmits a recharge signal to the access control device 1 indicating that a recharge can be initiated. For example, the recharge signal can be sent every morning at 7:00 AM. The microprocessor 20 instructs the battery recharge chip 45 to recharge the rechargeable battery upon receipt of the recharge signal (when the recharge enable flag is set).

In another embodiment, the host access control panel 220 transmits a timestamp signal to the access control device 1. The access control device 1 wakes up from sleep mode and receives the timestamp signal. The microprocessor 20 is programmed with a preset time threshold for recharging. The microprocessor 20 extracts the timestamp from the timestamp signal and determines if the current time is within the preset time threshold. In another embodiment, the access control device 1 maintains the current time locally and determines if the current time is within the preset time threshold. The preset time threshold can be updated during operation. For example, the host access control panel 220 can transmit a signal updating the time threshold depending on certain operating conditions. For example, the host access control panel 220 can update the time threshold based upon the status information and switch information received from the access control panel 1.

In another embodiment, the microprocessor 20 can determine when to recharge the rechargeable battery 12 based upon the solar cell 10 power (charge). The microprocessor 20 measures the V(solar) sense line 23 and periodically stores the measured values in memory (not shown). The microprocessor 20 examines the measured voltage values and calculates the relative change over time. The microprocessor 20 enables recharging of the rechargeable battery 12 when there is a positive scope in the measured voltage for a period of time. Alternatively, if there is no slope in the measured voltage values, the microprocessor 20 enables recharging of the rechargeable battery 12 when the measured voltage is greater than a predetermined threshold.

In another embodiment, the sleep interrupt history and door activity history is used to determine a time to enable recharging. For example, if the history shows that the rechargeable battery 12 is constantly being used to power the components of the access control device 1, the rechargeable battery 12 should not be charged during this time, e.g., beginning of a work shift there is maximum door unlocking. The microprocessor 20 will look for a period of time where the activity is a minimum, e.g., long interrupted sleep period. The microprocessor 20 will generate the recharge enable signal during a period of time where the rechargeable battery 12 is idle for the longest period of time.

If the microprocessor 20 determines that it is time to recharge the rechargeable battery 12 (at step 520), the recharge enable signal is sent to the battery recharge chip 45 via the recharge enable line 25. The battery recharge chip 45 initiates the recharging process at step 525. The solar cell 10 recharges the rechargeable battery 12. Once the recharging process starts, the microprocessor 20 returns to the power up start state 300.

If at step 515, the microprocessor 20 detects that the recharging process is currently active (i.e., battery recharge chip 45 recharging the rechargeable battery 12), the microprocessor 20 determines if the rechargeable battery 12 is fully charged at step 530. The microprocessor 20 measures the voltage on the V(batt) sense line 22 and compares the measured value with the apriori known fully charge. If the rechargeable battery 12 is fully charged, the microprocessor 20 issues a disable signal to the battery recharge chip 45 via the recharge enable line 25. The battery recharge chip 45 stops recharging the rechargeable battery, at step 535. Afterwards, the battery life calculator is reset, at step 540 and the microprocessor 20 returns to step 300. The actual time since last recharge is reset to zero. The microprocessor 20 starts the recounting the period.

If the rechargeable battery 12 is not fully charged, the battery recharge chip 45 continues recharging the rechargeable battery 12. The microprocessor 20 returns to step 300.

As noted during installation, the installer can force the rechargeable battery 12 to power the microprocessor 20 and the other components of the access control device 1 for a period of time to allow the solar cell capacitor 16 to charge. Typically, the access control device 1 is ship or stored in a dark area such that the solar cell 10 is uncharged. Therefore, the microprocessor 20 would not have enough power to operate. By depressing the toggle switch 35 the microprocessor's power line VDD can charge up from the rechargeable battery 12 as the solar cell capacitor 16 charges. The installer will release the toggle switch 35 when VDD 30 is charged, and the microprocessor 20 has enough charge on the VDD 30 to decide which power source to use.

The disclosed control extends the battery life of the rechargeable battery 12 by powering the components of the access control device 1 with the solar cell 10 and switching to the rechargeable battery 12 when needed. Additionally, the rechargeable battery 12 can be recharged while the access control device 1 is still in operation.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A wireless access apparatus for controlling access into a secure area comprising:

a first power source;

a second power source;

a controller for automatically switching between the first and second power source based at least on a calculated power level of the first and second power source, the controller is connected to either the first or the first and second power sources;

a manually operable switch having a first position for connecting the first power source to the controller and a second position for connecting the second power source to the controller; and an electromechanical transducer coupled to said controller for unlocking or locking an entrance into the secure area, said controller determines access to said secure area using information received from an access card wherein the first power source is a solar panel and the second power source is a rechargeable battery and wherein the controller decides if there is enough solar power for operation, if there is enough power for solar operation, the controller disconnects the rechargeable battery and if there is not enough power for solar operation the controller remains connected to the rechargeable battery and wherein the controller is initially connected to the solar panel during start up and the manually operable switch is a pushbutton that is depressed during startup to force the battery to be connected to and to power the controller during installation where the solar cell may not have had enough access to light.

2. The wireless access apparatus of claim 1, further comprising a recharging circuit electrically coupled to the rechargeable battery and electrically coupled to said solar panel, said recharging circuit adapted to recharge the rechargeable battery using power from the solar panel.

3. The wireless access apparatus of claim 2, wherein said controller issues a recharge enable signal to the recharging circuit instructing the recharging circuit to recharge the rechargeable battery, said controller issues a recharge enable signal based upon the rechargeable battery power and at least one preset condition.

4. The wireless access apparatus of claim 3, wherein said preset condition is a set time.

5. The wireless access apparatus of claim 3, wherein said preset condition is a power level of the solar panel.

6. The wireless access apparatus of claim 1, further comprising: a diode and capacitor, said diode having a first end coupled to the solar panel and a second end coupled to a first end of the capacitor, said capacitor storing energy from the solar panel.

7. The wireless access apparatus of claim 1, further comprising a transceiver for polling access cards within a predefined area and for receiving access information from said access cards.

8. The wireless access apparatus of claim 7, wherein said transceiver transmits the received access information to a remote host control device and receives an access enable or disable signal from said remote host control device based upon a comparison of the received access information and preset list of approved access cards.

9. The wireless access apparatus of claim 7, wherein said controller calculates a voltage level of said rechargeable battery and instructs the transceiver to transmit a battery dead signal to a remote host control device if the voltage level of said battery is lower than a predetermined threshold.

10. A wireless access apparatus for controlling access into a secure area comprising:

a first motion sensor for detecting motion in a first predetermined range;

a transceiver for polling access cards within the first predetermined range and for receiving access information from said access cards;

a controller for activating said transceiver to poll access cards within the first predetermined range, if said first motion sensor detects motion and for determining if an access card is within the first predetermined range; and an electromechanical transducer coupled to said controller for unlocking or locking an entrance into the secure area, said controller determines access to said secure area using information received from an access card; and two different power sources coupled to the controller and a manually operable switch coupled to the controller to select a source to energize at least the controller wherein a first of the two different power sources is a solar panel and a second of the two different power sources is a rechargeable battery and wherein the controller decides if there is enough solar power for operation, if there is enough power for solar operation, the controller disconnects the rechargeable battery and if there is not enough power for solar operation the controller remains connected to the rechargeable battery and wherein the controller is initially connected to the solar panel during start up and the manually operable switch is a pushbutton that is depressed during startup to force the battery to be connected to and to power the controller during installation where the solar cell may not have had access to light.

11. The wireless access apparatus of claim 10, further comprising a second motion sensor for detecting motion in a second predetermined range, wherein said controller instructs the electromechanical transducer to unlock the entrance if the controller determines that access is allowed into the secure area using information received from an access card and if the second motion sensor detects motion within a preset period of time after the first motion sensor detects motion.

12. The wireless access apparatus of claim 11, wherein said second predetermined range is smaller than said first predetermined range.

13. The wireless access apparatus of claim 11, wherein said second motion sensor is a capacitive sensing element coupled to a handle of the entrance.

14. A method of controlling access into a protected area comprising the steps of:

a controller detecting motion within a first predetermined range;

the controller activating a transmitter for polling access cards within the first predetermined range;

the controller determining if any access cards are within the first predetermined range;

the controller determining if any of the access cards within the first predetermined range is authorized for entry into the protected area;

the controller unlocking an entrance to the protected area based upon the determination of authorization;

the controller deciding if there is enough renewable power for operation, if there is enough renewable power for operation, disconnecting the rechargeable power source and if there is not enough renewable power for operation remaining connected to the rechargeable power source, wherein during startup, the controller is initially connected to the solar panel; and manually depressing a pushbutton during startup to force the rechargeable power source to be connected to and to power the controller in the case where the solar cell may not have had access to light.

15. The method of controlling access according to claim 14, further comprising the steps of:

detecting motion within a second predetermined range; and unlocking an entrance to the protected area based upon the determination of authorization and a detection result.

16. The method of controlling access according to claim 14, further comprising the steps of:

determining a voltage level of the renewable power source;

determining a voltage level of the rechargeable power source; and connecting either said renewable power source or both said renewable power source said rechargeable power source to a controller based upon the determined voltage levels.

17. The method of controlling access according to claim 16, further comprising the step of transmitting a low power message to a remote host access control device based upon the voltage level of the rechargeable power source.

18. The method of controlling access according to claim 16, further comprising the steps of:

switching a power source to the rechargeable power source;

calculating a rechargeable power life;

determining if it is time to recharge the rechargeable power source; and recharging the rechargeable power source based upon the determination.

19. The method of controlling access according to claim 18, wherein the step of determining if it is time to recharge the rechargeable power source, comprising:

receiving a recharge enable signal from a remote host access control device.

20. The method of controlling access according to claim 18, wherein the step of determining if it is time to recharge the rechargeable power source, comprising:

examining a past history of recharging times; and recharging the rechargeable power source based upon the examination.

21. The method of controlling access according to claim 18, wherein the step of determining if it is time to recharge the rechargeable power source, comprising:

examining a past history of access activity; and recharging the rechargeable power source based upon the examination.

22. The method of controlling access according to claim 18, wherein the step of determining if it is time to recharge the rechargeable power source, comprising:

measuring a voltage level over time of said renewable power source; and recharging the rechargeable power source if the voltage level exhibits a positive change.

* * * * *